US008845206B2

(12) United States Patent
Chan et al.

(10) Patent No.: US 8,845,206 B2
(45) Date of Patent: Sep. 30, 2014

(54) APPARATUS FOR PLUGGING MULTIPLE CONNECTORS WITH SPRING LOADED SLEEVES INTO AN ADAPTER SIMULTANEOUSLY

(75) Inventors: Kenneth Y. Chan, Hopewell Junction, NY (US); Dennis Denizard, Poughkeepsie, NY (US); Michael J. Fisher, Poughkeepsie, NY (US); Gilles G. Labbe, Quebec (CA); James E. Tersigni, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 13/074,748

(22) Filed: Mar. 29, 2011

(65) Prior Publication Data

US 2012/0251054 A1   Oct. 4, 2012

(51) Int. Cl.
*G02B 6/36* (2006.01)
*G02B 6/38* (2006.01)

(52) U.S. Cl.
CPC ............ *G02B 6/3879* (2013.01); *G02B 6/3825* (2013.01); *G02B 6/3893* (2013.01); *G02B 6/3885* (2013.01); *G02B 6/3898* (2013.01)
USPC .................. 385/76; 385/53; 385/54; 385/55; 385/56; 385/57; 385/58; 385/59; 385/60; 385/61; 385/62; 385/63; 385/64; 385/65; 385/66; 385/67; 385/68; 385/69; 385/70; 385/71; 385/72; 385/73; 385/74; 385/75; 385/77; 385/78; 385/79; 385/80; 385/81; 385/82; 385/83; 385/84; 385/85; 385/86; 385/87; 385/88; 385/89; 385/136; 385/137; 385/138; 385/139

(58) Field of Classification Search
None
See application file for complete search history.

(56) References Cited

U.S. PATENT DOCUMENTS

| 3,671,925 | A | | 6/1972 | Drapkin |
| 3,699,502 | A | | 10/1972 | Carter |
| 4,730,891 | A | * | 3/1988 | Poorman .......................... 385/74 |
| 4,848,870 | A | | 7/1989 | Wisecarver et al. |
| 5,806,176 | A | | 9/1998 | Biche |
| 6,030,232 | A | | 2/2000 | Haggard et al. |
| 6,394,831 | B1 | | 5/2002 | Bowers et al. |
| 6,439,780 | B1 | | 8/2002 | Mudd et al. |
| 6,736,683 | B2 | | 5/2004 | Brand et al. |
| 6,769,814 | B2 | * | 8/2004 | Kiani et al. ...................... 385/78 |

(Continued)

OTHER PUBLICATIONS

AMP* Insertion Tools 59803-1 and 59804-1 for Mass Termination Assembly (MTA) Connectors, released Dec. 16, 1988, pp. 1-3, IS 7907, Harrisburg, PA.

*Primary Examiner* — Ryan Lepisto
*Assistant Examiner* — Guy Anderson
(74) *Attorney, Agent, or Firm* — Cantor Colburn LLP; Margaret McNamara

(57) ABSTRACT

An apparatus is provided and includes a housing, a block formed to define an array of holes corresponding to an array of plugs into which connectors with spring loaded sleeves are pluggable such that the block engages with a respective sleeve of each connector, the block being supportively disposed within the housing to be movable with respect to the housing between first and second block positions at which the sleeves are extended and retracted, respectively and a cam lever supported on the housing and coupled to the block, which selectively occupies first and second lever positions at which the cam lever causes the block to assume the first and second block positions, respectively.

25 Claims, 4 Drawing Sheets

(56) References Cited

U.S. PATENT DOCUMENTS

| | | |
|---|---|---|
| 7,003,208 B2 | 2/2006 | Yamaguchi et al. |
| 7,390,203 B2 * | 6/2008 | Murano et al. ............... 439/138 |
| 7,534,115 B2 * | 5/2009 | Murano et al. ............... 439/138 |
| 7,625,134 B2 * | 12/2009 | Pitwon et al. ................. 385/88 |
| 8,233,762 B1 * | 7/2012 | Boyden et al. ............... 385/134 |
| 2003/0044125 A1 * | 3/2003 | Kiani et al. .................. 385/78 |
| 2008/0090433 A1 * | 4/2008 | Murano et al. ............... 439/131 |
| 2009/0046981 A1 * | 2/2009 | Margolin et al. .............. 385/70 |
| 2009/0052904 A2 * | 2/2009 | Pitwon et al. ................. 398/139 |
| 2009/0191758 A1 * | 7/2009 | Aekins ..................... 439/620.01 |
| 2010/0111484 A1 * | 5/2010 | Allen .......................... 385/135 |
| 2011/0250771 A1 * | 10/2011 | Suzuki et al. ................ 439/157 |
| 2011/0269325 A1 * | 11/2011 | Gosis et al. .................. 439/265 |
| 2012/0033926 A1 * | 2/2012 | de Jong ....................... 385/135 |
| 2013/0163932 A1 * | 6/2013 | Cooke et al. ................. 385/76 |
| 2013/0236139 A1 * | 9/2013 | Chen et al. ................... 385/60 |

* cited by examiner

APPARATUS FOR PLUGGING MULTIPLE CONNECTORS WITH SPRING LOADED SLEEVES INTO AN ADAPTER SIMULTANEOUSLY

FEDERALLY SPONSORED RESEARCH AND DEVELOPMENT

This invention was made with Government support under contract number HR0011-07-9-0002 awarded by the Defense Advanced Research Projects Agency (DARPA). The Government has certain rights to this invention.

BACKGROUND

The present invention relates to an apparatus for plugging multiple connectors with spring loaded sleeves into an adapter simultaneously.

The process of assembling multiple fiber optic multi-fiber termination push-on (MPT) connectors into an adapter is difficult to accomplish and time consuming. Often, adapter requires over 100 individual plugs of the fiber optic MPT connectors with each plug requiring that the spring loaded sleeve of each connector be pulled back individually. The force required to do so is substantial and must be applied for each plug and thus requires that the operator expend a significant amount of strength and energy over a relatively long period of time to complete an assembly.

For example, full Insertion of a single fiber optic connector into a receptacle requires overcoming at least three forces. These include the force associated with the spring loaded sleeve of the fiber optic connector, the force required to spread receptacle fingers and the force required to engage the ferrule at the very end of the fiber optic connector in position. While inserting the fiber optic connector into the receptacle, the spring loaded sleeve is supported by the face of the receptacle, which compresses the springs and retracts the sleeve. Simultaneously, bumps on the two sides of the fiber optic connector push the receptacle fingers outward. Forcing the fiber optic connector into the receptacle past its resting location allows the receptacle fingers to open enough so that the bumps can pass through. Releasing the excess force from the fiber optic connector allows the spring loaded sleeve to extend over the receptacle fingers, thus locking the fiber optic connector in place. That is, the spring loaded sleeve is now extended over the receptacle fingers and does not allow them to open outward.

To remove the fiber optic connector, the operator is required to pull the spring loaded sleeve back so the receptacle fingers will be allowed to open outward, which in turn allows the bumps to pass through while exiting the receptacle.

SUMMARY

According to an aspect of the present invention, an apparatus is provided and includes a housing, a block formed to define an array of holes corresponding to an array of plugs into which connectors with spring loaded sleeves are pluggable such that the block engages with a respective sleeve of each connector, the block being supportively disposed within the housing to be movable with respect to the housing between first and second block positions at which the sleeves are extended and retracted, respectively and a cam lever supported on the housing and coupled to the block, which selectively occupies first and second lever positions at which the cam lever causes the block to assume the first and second block positions, respectively.

According to another aspect of the invention, an apparatus for plugging connectors with spring loaded sleeves into an array of plugs simultaneously is provided and includes a housing, a block formed to define an array of holes corresponding to the array of plugs into which the multiple connectors with spring loaded sleeves are pluggable such that the block engages with a respective sleeve of each connector, the block being supportively disposed within the housing to be movable with respect to the housing between first and second block positions at which the sleeves are extended and retracted, respectively, and a cam lever supported on the housing and coupled to the block, which selectively occupies first and second lever positions at which the cam lever causes the block to assume the first and second block positions, respectively.

According to another aspect of the invention, an apparatus for plugging connectors with spring loaded sleeves into an array of plugs simultaneously is provided and includes a housing, a block formed to define an array of holes corresponding to the array of plugs into which the multiple connectors with spring loaded sleeves are pluggable such that the block engages with a respective sleeve of each connector, the block being supportively disposed within the housing to be movable with respect to the housing between first and second block positions at which the sleeves are extended and refracted, respectively, a cam lever supported on the housing, which selectively occupies first and second lever positions and a linkage operably coupled to the cam lever and the block which causes the block to assume the first and second block positions responsive to the cam lever selectively occupying the first and second lever positions, respectively.

According to yet another aspect of the invention, a method of plugging connectors with spring loaded sleeves into an array of plugs simultaneously is provided and includes arranging the connectors in an array corresponding to the array of plugs, engaging each of the respective spring loaded sleeves of the connectors, mechanically retracting each of the respective sleeves simultaneously, plugging the connectors into the plugs and permitting each of the respective sleeves to extend simultaneously.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with aspects of the invention, a tool is provided that pulls back the spring loaded sleeves of each fiber optic MPT connector to thereby allow an operator to plug the connectors without having to overcome the forces of each of the multiple sleeves.

Figure 1:
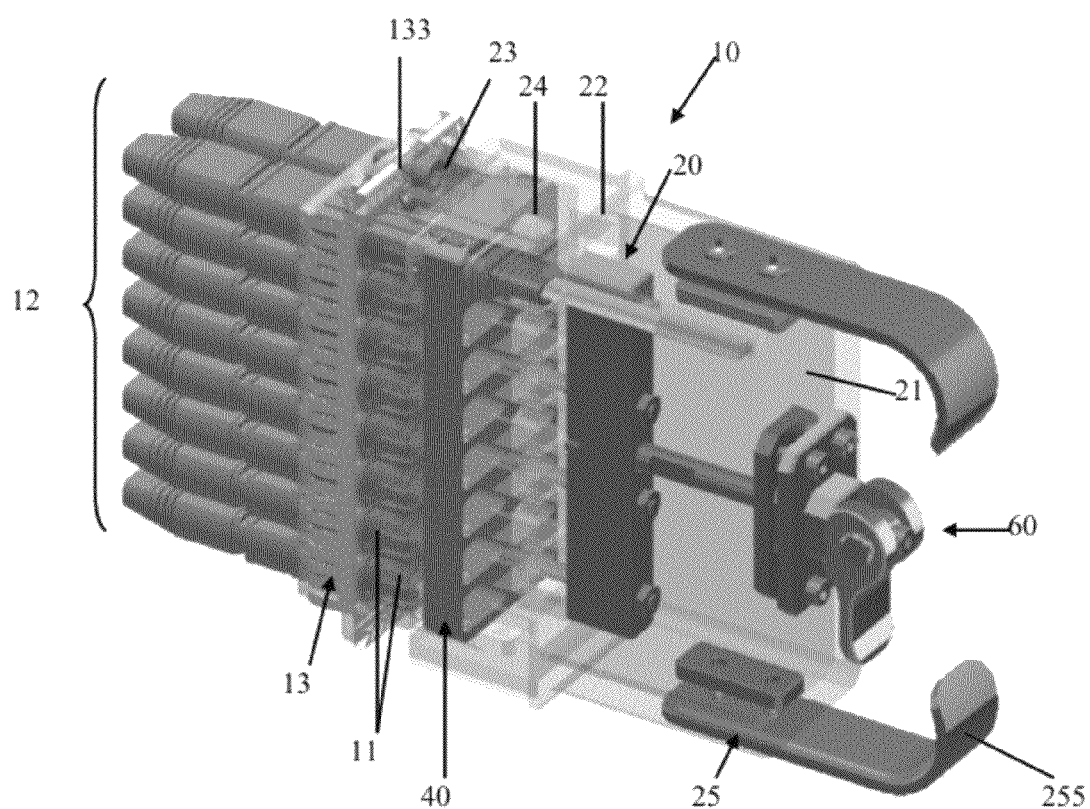
FIG. 1 is a perspective view of an apparatus for plugging connectors with spring loaded sleeves into an array of module connectors simultaneously.

With reference to FIG. 1, an apparatus 10 is provided for plugging multiple fiber optic connectors 11 with spring loaded sleeves into an array of plugs 12 of an adapter 13 simultaneously. The array plugs 12 may be supportively held within the adapter 13 in a substantially rectangular shape. The adapter 13 includes an adapter attachment portion 133. In an embodiment, as shown in FIG. 1, the array of plugs 12 may include 16 plugs arranged in a 2×8 configuration but it is to be understood that many other embodiments exist with each being within the scope of this disclosure. However, for the purpose of clarity and brevity, only the 2×8 embodiment will be discussed below.

The apparatus 10 includes a housing 20, a block 40 and a cam lever 60. The housing 20 is formed as a block-shaped substantially rectangular volumetric enclosure having a rear wall 21, sidewalls 22 extending from opposite ends of the rear wall 21 in substantially similar, parallel directions and a housing attachment portion 23. The housing attachment portion 23 is provided at lead ends of the sidewalls 22 axially remote from the rear wall 21 and is selectively attachable with the adapter attachment portion 133 of the adapter 13. The housing 20 further includes a dust cover 24, which is supported by the sidewalls 22 and disposable about the block 40 and one or more handles 25. The one or more handles 25 are fixed to the sidewalls 22 and extend rearwardly beyond the rear wall 21. The one or more handles 25 may include grip portions 255 that are configured for facilitating operation of the apparatus 10 by an operator. The handles 25 may be provided in multiple shapes and sizes as shown in the embodiment of FIG. 1 and the alternate embodiments of FIGS. 2-4.

Figure 2:
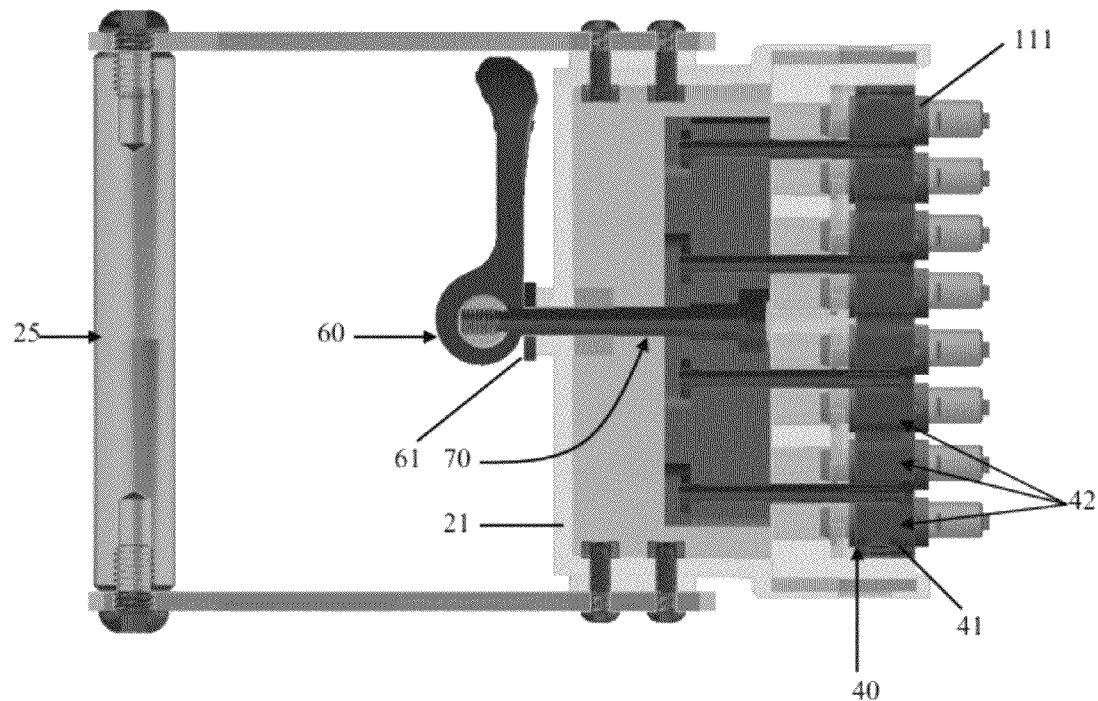
FIG. 2 is a perspective view of the housing of the apparatus of FIG. 1.
Figure 3:
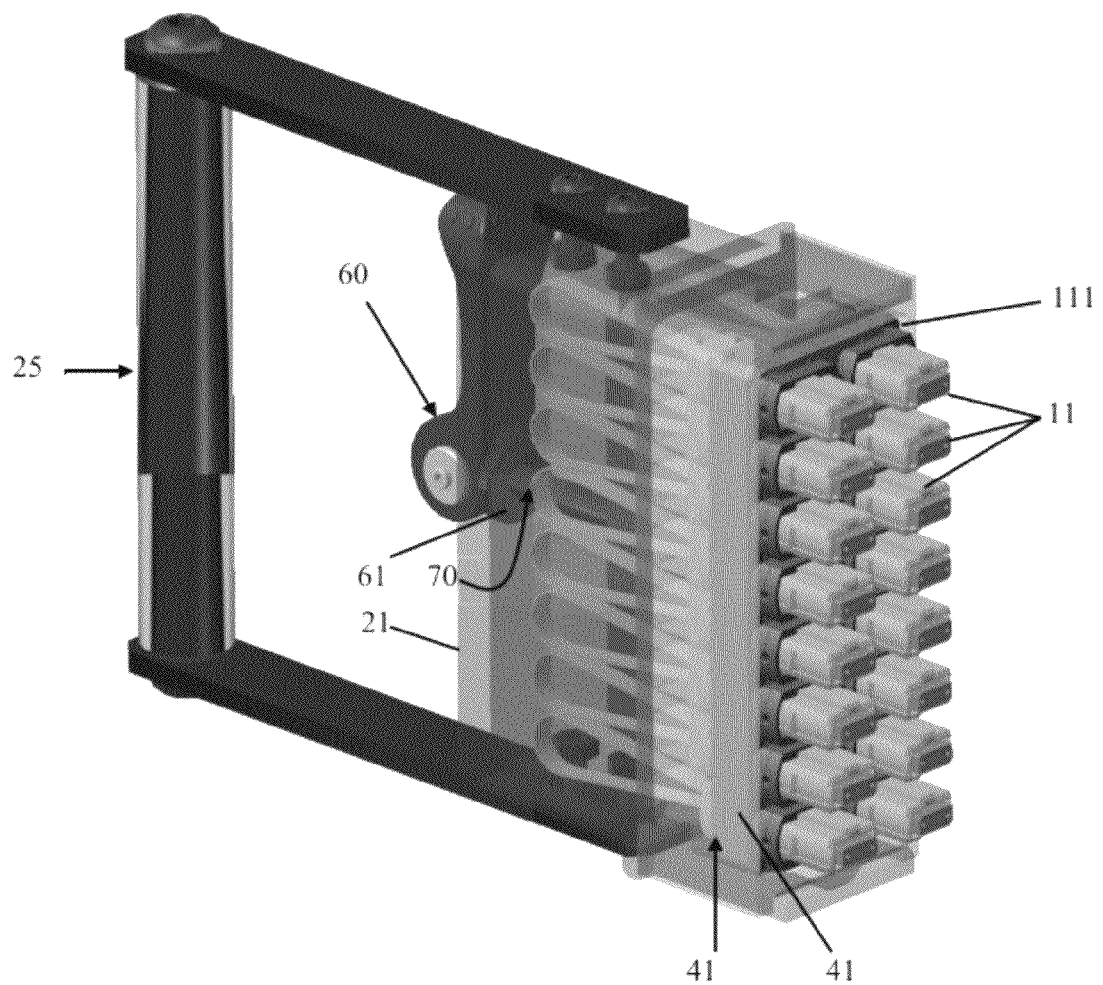
FIG. 3 is a top view of the housing of the apparatus of FIG. 1.
Figure 4:
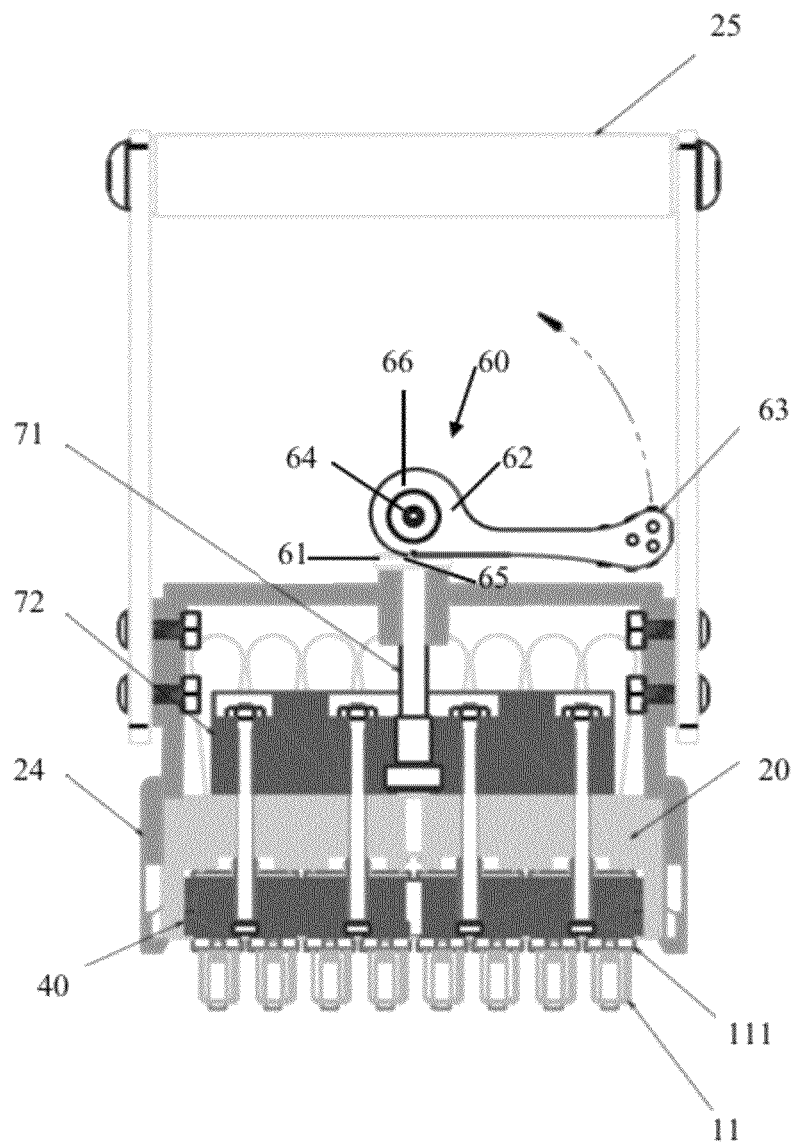
FIG. 4 is a schematic view of a linkage of the apparatus of FIG. 1.

With reference to FIGS. 2-4, the block 40 has a body 41 that has a shape similar to that of the adapter 13. The body 41 is formed to define an array of connector holes 42, which, in the example of the 2×8 adapter 13 configuration described above, is provided in a likewise 2×8 configuration. Each of the multiple connectors 11 with spring loaded sleeves is pluggable into a corresponding one of the connector holes 42 such that the body 41 engages with the respective spring-loaded sleeve 111 of each connector 11. The respective spring-loaded sleeve 111 of each connector is biased to assume an extended position whereby the sleeve 111 must be retracted against the bias in order for the connector 11 to be connected to the corresponding one of the plugs 12. Normally, the refraction would have to be done manually for each connector 11 as explained above. However, in accordance with aspects of the invention, the retraction of all the sleeves is achieved mechanically and simultaneously.

The block 40 is supportively disposed within the housing 20. More particularly, the block 40 is supportively disposed within the housing 20 to be movable with respect to the housing 20 between a first block position and a second block position. The first block position is defined as the position of the block 40 with respect to a given point on the housing 20 at which each of the respective sleeves 111 is extended with each connector 11 already having been plugged into a corresponding one of the connector holes 42. By contrast, the second block position is defined as the position of the block 40 with respect to the given point on the housing 20, again, with each connector 11 already having been plugged into a corresponding one of the connector holes 42, at which each of the respective sleeves 111 is retracted. That is, as the block 40 moves to and from each of the first and second block positions, the sleeves 111 correspondingly move to and from the extended and retracted conditions.

In accordance with embodiments, the block 40 approaches the rear wall 21 to assume the second block position and recedes from the rear wall 21 to assume the first block position. Thus, it may be seen that the block 40 is movable with respect to the housing 20 along a longitudinal axis of, for example, the spring-sleeved connectors 11. However, it is to be understood that this description of the movement of the block 40 is merely exemplary and that other movement types/directions are possible.

The cam lever 60 is supported on the housing 20 and is configured to selectively occupy first and second lever positions. In the embodiment in which the block 40 is movable as described above, the cam lever 60 may be supported on the rear wall 21 of the housing 20. In this case, a cam lever seat 61 may be provided on the rear wall 21 with the cam lever 60 being biased toward the cam lever seat 61 by the bias applied to the multiple connectors 11 by the spring-loaded sleeves 111.

The cam lever 60 includes a body 62 and a lever 63. The lever 63 extends from the body 62 and serves as a mechanism by which an operator can rotate the body 62. The body 62 may be formed of first and second irregularly annular members that face one another at a predefined separation distance. Each of the first and second members has a central aperture and generally rounded outer edges. The shapes of each of the first and second members are substantially similar and aligned. A bar 64 fixedly extends through each central aperture. Each of the first and second members further includes first and second sides 65 and 66. The first and second sides have differing thicknesses as measured from the outer diameter of the central apertures.

With this configuration, the cam lever 60 may be seated in the cam lever seat 61 and is rotatable about a longitudinal axis of the bar 64 such that one of the first and second sides 65 and 66 engages with the cam lever seat 61. As such, when the cam lever 60 is rotated to the first lever position such that the first side 65 engages with the cam lever seat 61, the bar 64 is axially positioned relative to the cam lever seat 61 in accordance with a thickness of the first side 65. By contrast, when the cam lever 60 is rotated to the second lever position such that the second side 66 engages with the cam lever seat 61, the bar 64 is axially positioned relative to the cam lever seat 61 in accordance with a thickness of the second side 66. Thus, if the second side 66 is thicker than the fist side 65, the bar 64 will be axially positioned farther from the cam lever seat 61 when the second side 66 engages with the cam lever seat 61.

The apparatus 10 further includes a linkage 70. The linkage 70 is operably coupled to the cam lever 60 and the block 40 such that operation of the cam lever 60 by the operator causes the block 40 to move as described herein. In particular, the linkage 70 causes the block 40 to assume the first block position in response to the cam lever 60 selectively occupying the first lever position. Similarly, the linkage 70 causes the block 40 to assume the second block position in response to the cam lever 60 selectively occupying the second lever position.

The linkage 70 may include an actuation rod 71 and an actuation block 72. The actuation rod 71 has a tubular shape and is disposed to extend from a rear face of the actuation block 72, through the rear wall 21 and through the space defined between the first and second members. Where the actuation rod extends through the space defined between the first and second members, the actuation rod 71 is formed to define a through-hole through which the bar 64 extends. In this way, the actuation rod 71 moves longitudinally in response to movement of the cam lever 60 toward selective occupation of the first and second lever positions, which as described above, is associated with different axial positions of the bar 64. The actuation block 72 is coupled to the actuation rod 71 and the block 40 and transmits the longitudinal movement of the actuation rod 71 to the block 40. The cam lever 60 may be rotatable about a longitudinal axis of the actuation rod 71.

Thus, in accordance with aspects of the invention, multiple spring loaded fiber optic connectors 11 are held in a set array matching up with plugs 12 by a machined block 40 that engages around the spring loaded sleeves 111 of each connector 11. The actuation rod 71 is connected to the block 40 at one end thereof and has a cam lever 60 coupled to its other end. At an initial time, the respective spring loaded sleeves 111 of each connector 11 is provided in the extended position with the connectors 11 having been plugged into the block 40 such that the block 40 engages with the sleeves 111. The cam lever 60 is used to retract the spring loaded sleeves 111 of the fiber optic connectors 11. This is accomplished by the operator flipping the cam lever 60 toward the cam lever position at which the thicker one of the first and second sides 65 and 66 engages with the cam lever seat 61. This causes the bar 64, the actuation rod 71 and the actuation block 72 to translate, which, in turn, causes the block 40 to translate and pull the sleeves 111 into the retracted position.

Once the sleeves 111 are retracted the user can relatively easily plug the array of connectors 11 into the plugs 12 without having to overcome the spring force of each of the spring loaded sleeves 111 of each connector 11. Once the connectors 11 are plugged into the plugs 12, the cam lever 60 may be flipped toward the other cam lever position at which the thinner one of the first and second sides 65 and 66 engages with the cam lever seat 61. This causes the bar 64, the actuation rod 71 and the actuation block 72 to translate, which, in turn, allows for a release of the spring loaded sleeves 111 that allows the spring loaded sleeves 111 to return to their extended positions. In so doing, the connectors 11 are locked into place with respect to the plugs 12.

To remove the connectors 11 from the plugs 12, the cam lever 60 is re-flipped and the sleeves 111 are again retracted. The handles 25 are then used to uniformly unplug the connectors 11 from the plugs 12.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus, comprising:
    a housing;
    a block formed to define an array of holes corresponding to an array of plugs into which connectors with spring loaded sleeves are pluggable such that the block engages with a respective sleeve of each connector,
    the block being supportively disposed within the housing to be movable with respect to the housing between first and second block positions at which the sleeves are extended and retracted, respectively; and
    a cam lever supported on the housing and coupled to the block, which selectively occupies first and second lever positions at which the cam lever causes the block to assume the first and second block positions, respectively.

2. An apparatus for plugging connectors with spring loaded sleeves into an array of plugs simultaneously, the apparatus comprising:
    a housing;
    a block formed to define an array of holes corresponding to the array of plugs into which the multiple connectors with spring loaded sleeves are pluggable such that the block engages with a respective sleeve of each connector,
    the block being supportively disposed within the housing to be movable with respect to the housing between first and second block positions at which the sleeves are extended and retracted, respectively; and
    a cam lever supported on the housing and coupled to the block, which selectively occupies first and second lever positions at which the cam lever causes the block to assume the first and second block positions, respectively.

3. The apparatus according to claim 2, wherein the housing comprises:
    a rear wall; and
    sidewalls extending from opposite ends of the rear wall.

4. The apparatus according to claim 3, wherein the housing comprises an attachment portion at lead ends of the sidewalls, the attachment portion being attachable to a connector block supportive of the array of plugs.

5. The apparatus according to claim 3, wherein the housing comprises a dust cover supported by the sidewalls and disposable about the block.

6. The apparatus according to claim 3, further comprising one or more handles fixed to the sidewalls.

7. The apparatus according to claim 3, wherein the block approaches and recedes from the rear wall to assume the second and first block positions, respectively.

8. The apparatus according to claim 2, wherein the block is movable with respect to the housing along a longitudinal axis of the spring-sleeved connectors.

9. The apparatus according to claim 2, wherein the cam lever is biased toward a cam lever seat.

10. The apparatus according to claim 9, wherein the cam lever comprises:
   a body having first and second sides of differing thicknesses; and
   a lever by which an operator rotates the body such that one of the first and second sides engages with the cam lever seat.

11. The apparatus according to claim 2, further comprising a linkage by which the cam lever is operably coupled to the block.

12. The apparatus according to claim 11, wherein the linkage comprises:
   an actuation rod, which moves longitudinally in response to movement of the cam lever to selectively occupy the first and second lever positions; and
   an actuation block to transmit the longitudinal movement of the actuation rod to the block.

13. The apparatus according to claim 12, wherein the cam lever is rotatable about a longitudinal axis of the actuation rod.

14. An apparatus for plugging connectors with spring loaded sleeves into an array of plugs simultaneously, the apparatus comprising:
   a housing;
   a block formed to define an array of holes corresponding to the array of plugs into which the multiple connectors with spring loaded sleeves are pluggable such that the block engages with a respective sleeve of each connector,
   the block being supportively disposed within the housing to be movable with respect to the housing between first and second block positions at which the sleeves are extended and retracted, respectively;
   a cam lever supported on the housing, which selectively occupies first and second lever positions; and
   a linkage operably coupled to the cam lever and the block which causes the block to assume the first and second block positions responsive to the cam lever selectively occupying the first and second lever positions, respectively.

15. The apparatus according to claim 14, wherein the housing comprises:
   a rear wall; and
   sidewalls extending from opposite ends of the rear wall.

16. The apparatus according to claim 15, wherein the housing comprises an attachment portion at lead ends of the sidewalls, the attachment portion being attachable to a connector block supportive of the array of plugs.

17. The apparatus according to claim 15, wherein the housing comprises a dust cover supported by the sidewalls and disposable about the block.

18. The apparatus according to claim 15, further comprising one or more handles fixed to the sidewalls.

19. The apparatus according to claim 15, wherein the block approaches and recedes from the rear wall to assume the second and first block positions, respectively.

20. The apparatus according to claim 14, wherein the block is movable with respect to the housing along a longitudinal axis of the spring-sleeved connectors.

21. The apparatus according to claim 14, wherein the cam lever is biased toward a cam lever seat.

22. The apparatus according to claim 21, wherein the cam lever comprises:
   a body having first and second sides of differing thicknesses; and
   a lever by which an operator rotates the body such that one of the first and second sides engages with the cam lever seat.

23. The apparatus according to claim 14, wherein the linkage comprises:
   an actuation rod, which moves longitudinally in response to movement of the cam lever to selectively occupy the first and second lever positions; and
   an actuation block to transmit the longitudinal movement of the actuation rod to the block.

24. The apparatus according to claim 23, wherein the cam lever is rotatable about a longitudinal axis of the actuation rod.

25. A method of plugging connectors with spring loaded sleeves into an array of plugs simultaneously, the method comprising:
   arranging the connectors in an array corresponding to the array of plugs;
   engaging each of the respective spring loaded sleeves of the connectors;
   mechanically retracting each of the respective sleeves simultaneously;
   plugging the connectors into the plugs; and
   permitting each of the respective sleeves to extend simultaneously.

* * * * *